(12) United States Patent
Gretz

(10) Patent No.: US 6,581,884 B1
(45) Date of Patent: Jun. 24, 2003

(54) ROD CABLE SUPPORT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 87 days.

(21) Appl. No.: 09/956,611

(22) Filed: Sep. 19, 2001

(51) Int. Cl.[7] .................................................. F16L 3/08
(52) U.S. Cl. ...................... 248/74.1; 248/74.2; 248/68.1; 248/62; 24/278; 24/279
(58) Field of Search ............................. 248/68.1, 74.1, 248/74.3, 74.2, 74.4, 62, 49, 69; 24/278, 279; 274 WB

(56) References Cited

U.S. PATENT DOCUMENTS

| | | | | |
|---|---|---|---|---|
| 2,215,283 A | * | 9/1940 | Adler ............................ 174/40 |
| 2,455,598 A | * | 12/1948 | Michalenko ................. 248/74 |
| 3,273,838 A | * | 9/1966 | Fletcher et al. ................ 248/62 |
| 3,565,468 A | * | 2/1971 | Garrett ......................... 285/373 |
| 3,684,223 A | * | 8/1972 | Logsdon ...................... 248/74 |
| 4,445,255 A | * | 5/1984 | Olejak ........................... 24/284 |
| 4,556,352 A | | 12/1985 | Resnicow |
| 4,858,860 A | * | 8/1989 | Richards ....................... 248/62 |
| 4,953,899 A | * | 9/1990 | Printiss, Sr. ................. 285/420 |
| 5,870,804 A | * | 2/1999 | Wylin ........................... 24/279 |
| 5,921,734 A | | 7/1999 | Kataoka |
| 6,102,341 A | | 8/2000 | Ball |
| 6,146,076 A | | 11/2000 | Bodin |
| 6,254,040 B1 | | 7/2001 | McGrath |
| 6,317,933 B1 | * | 11/2001 | Suenaga ......................... 24/16 |
| 6,351,034 B1 | * | 2/2002 | Farnworth et al. ........... 257/727 |

* cited by examiner

*Primary Examiner*—Anita King
*Assistant Examiner*—Steven Marsh

(57) ABSTRACT

A one-piece threaded rod cable support including a cable-holding portion and two arms extending in a perpendicular plane from the cable-holding portion. The arms include claw-shaped ends to accommodate and snap-fittingly engage a rod. Upon engagement of the arms with the rod, an integral brace, provided on the exterior of the cable-holding portion between the two arms, is deflected inwardly toward the cable-holding portion. Deflection of the brace puts pressure on the interior sides of the claw-shaped ends, thereby bracing the cable support on the rod and providing resistance to disengagement caused by loading or bending of the cable-holding portion. A snap-lock arrangement may be provided on the cable-holding portion to allow easy opening and closing of the ring.

5 Claims, 2 Drawing Sheets

ROD CABLE SUPPORT

FIELD OF THE INVENTION

This invention relates to cable supports and specifically to an improved cable support for attachment to a rod.

BACKGROUND OF THE INVENTION

The proliferation of computers, fax machines, and telecommunication networks have led to an increase in the amount of cabling installed in residential and commercial buildings. To simplify and speed up installation time, it is common to connect cables to existing and convenient structures within the buildings. Many commercial buildings have existing structural support beams that run throughout the building. As the beams are typically overhead, it is usually preferable to suspend the cables from them.

Many manufacturers produce beam clamps for the purpose of hanging items from beams. Several types of beam clamps are intended for suspending a vertical rod from the beam. A series of vertical rods may then be suspended from the beam to create a path for connecting ductwork, conduit, cables, etc. Cable supports may then be connected to the vertical rods for the purpose of running cables along the beams. In many instances, vertical rods may have previously been clamped to beams for the purpose of suspending ductwork or conduit. In these situations, cable supports may be connected to the existing vertical rods that are in place.

One type of cable support that has been proposed for suspending cables from vertical rods is that of U.S. Pat. No. 6,146,076 (the '076 patent) to Bodin entitled "Support Structure Including a Snap Nut. The cable support of the '076 patent is intended for use with threaded rods and includes a snap nut with ears. The snap nut has a central bore and a longitudinal slot into the bore that allows it to be snapped onto a threaded rod. The interior of the bore is threaded to allow repositioning of the snap nut after it is snapped onto the threaded rod. A separate hook member, adapted to straddle the threaded rod and engage the top of the snap nut including the ears, is then placed above the snap nut and lowered until notches in the hook member engage the ears of the snap nut. The hook member of the '076 patent is U-shaped to provide an opening to accept cables.

The snap nut and hook member of the '076 patent, although useful for suspending cables from a threaded vertical rod, have some limitations. One limitation is the requirement that the snap nut and hook be used with a threaded rod. In many existing buildings, ductwork and the like may be suspended by smooth rods, making it desirable to use the available smooth rods rather than installing threaded rods. In this situation, the snap nut and hook member of the '076 patent would not be useful.

A second limitation is the fact that the '076 patent provides a wide opening on the open end of the U-shaped hook member. This necessitates the use of a cable tie to close the top of the U-shaped hook member to hold the cables securely.

An additional limitation of the snap nut and hook member of the '076 patent is the fact that three separate parts, including the snap nut, hook member, and cable tie, must be manufactured and utilized to create an effective cable support for use with a vertical threaded rod.

Accordingly, it should be understood that what is needed is a one-piece cable support that may be used with both threaded and smooth rods and secures inserted cables without the use of separate cable ties.

SUMMARY OF THE INVENTION

The present invention comprises a one-piece rod cable support including a cable-holding portion and two arms extending in a perpendicular plane from the cable-holding portion. The arms include claw-shaped ends to accommodate and snap-fittingly engage an anchored rod. Upon engagement of the arms with the rod, a serrated brace, provided on the exterior of the cable-holding portion between the two arms, is deflected inwardly toward the cable-holding opening. Deflection of the brace puts pressure on the interior sides of the claw-shaped ends, thereby bracing the cable support on the threaded rod and providing resistance to disengagement caused by loading or bending of the cable-holding portion. After being snapped on the rod, the serrated portion of the brace meshes with the threads of the rod, helping to stabilize the cable support with respect to the rod and preventing unwanted movement axially along the rod. A snap-lock arrangement is provided on the cable-holding portion to allow easy opening and closing of the ring. When snapped closed, the snap-lock arrangement secures the cables within the cable-holding portion and resists opening without human intervention.

Figure 1:
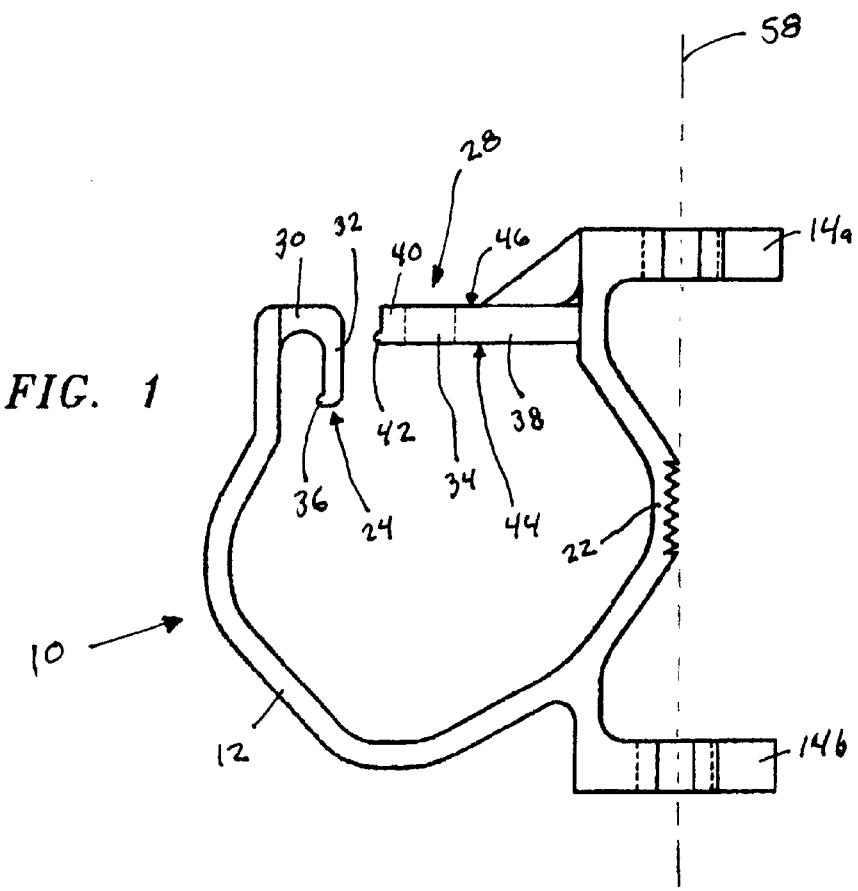
FIG. 1 is a plan view of the preferred embodiment of the one-piece rod cable support of the present invention with the cable-holding portion in an open configuration.

Index to Reference Numerals in Drawings 10 rod cable support
12 cable-holding portion
14a top arm
14b bottom arm
16a top claw-shaped end
16b bottom claw-shaped end
18a circular bore (top arm)
18b circular bore (bottom arm)
20a slot (top arm)
20b slot (bottom arm)
22 brace
24 end (of cable-holding portion)
26 rear side of top arm
28 head extension
30 latch
32 nose portion
34 latch-receiving pocket
36 lip
38 inner portion (of head extension)
40 outer portion (of head extension)
42 nub
44 bottom surface (of head extension)
46 top surface (of head extension)
48 adjacent inner surface (of cable-holding portion)
50a outer periphery (of top arm)
52 bundle of cables 54 threaded rod
56 serrations
58 axis

DETAILED DESCRIPTION OF THE INVENTION

Figure 4:
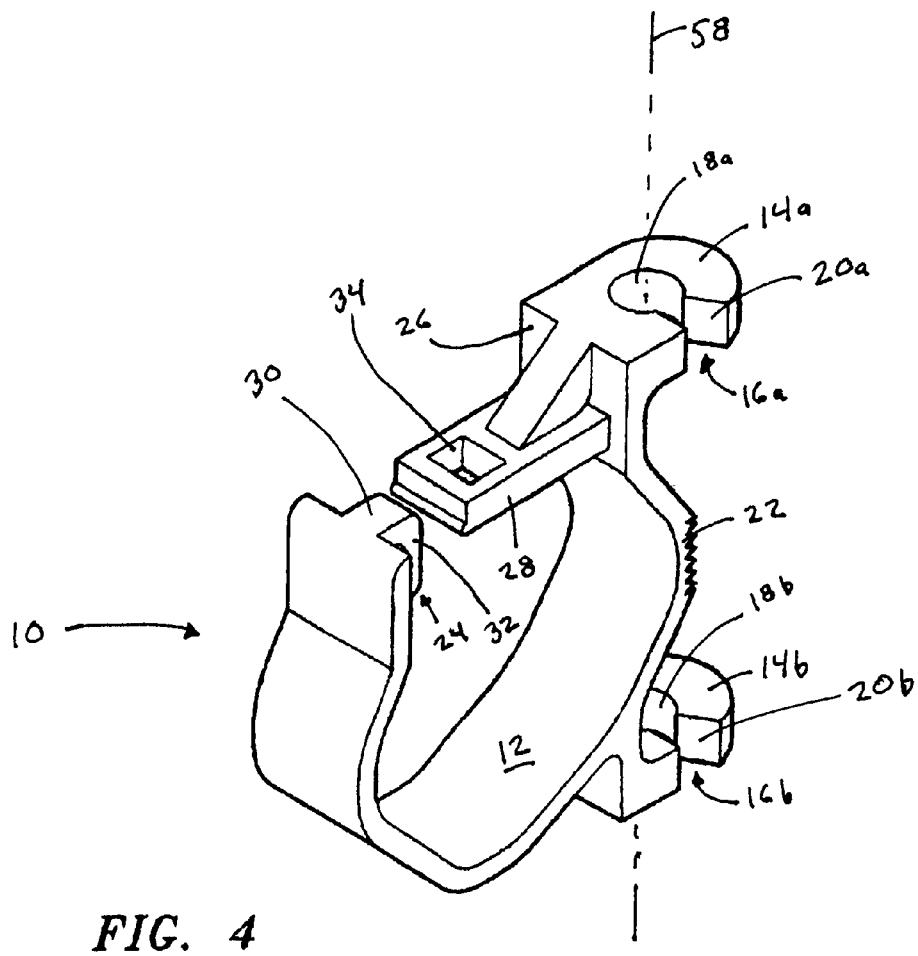
FIG. 4 is a perspective view of the rod cable support of FIG. 1 with the cable-holding portion in an open configuration.

The present invention is a rod cable support as shown in the perspective view of the preferred embodiment in FIG. 4 and designated by reference numeral 10. The rod cable support 10 is of one-piece construction, typically molded of a durable polymeric material such as nylon. The cable support consists of a cable-holding portion 12 with two arms 14a, 14b extending from the cable-holding portion 12, each arm in a plane perpendicular to the plane of the cable-holding portion 12. Each arm 14a, 14b includes a claw shaped end 16a, 16b in alignment with each other. The claw-shaped ends 16a, 16b consist of a circular bore 18a, 18b and a slot 20a, 20b that is wider at the periphery of each arm than at the bore. The cable-holding portion 12 includes an integral brace 22 on its outer edge between the two arms 14a, 14b and terminates in an end 24 near the top arm 14a. With the rod cable support 10 in its unbiased position, as shown in FIG. 4, the integral brace 22 extends typically to the central axis 58 through the two circular bores 18a, 18b. As a consequence of the thinness of the cable-holding portion 12 and its polymeric construction, the end 24 may easily be grasped and pulled away from the arms 14a, 14b to greatly open the cable-holding portion 12 for the purposes of inserting cable therein. Extending from the rear side 26 of the top arm 14a is a head extension 28. The head extension 28 and the end of the cable-holding portion 12 include a snap-lock arrangement that allows the end 24 of the cable-holding portion 12 to be snapped into the head extension 28. This snap-lock arrangement includes a latch 30 and nose portion 32 on the end 24 of the cable-holding portion 12 and a latch-receiving pocket 34 on the head extension 28.

Referring now to FIG. 1, a plan view of the preferred embodiment, further details of the snap-lock arrangement are shown. The end 24 of the cable-holding portion 12 includes the latch 30, nose portion 32 integral with the latch 30, and a lip 36 integral with the nose portion 32. The head extension 28 can be described as having two portions on either side of the latch-receiving pocket 34 (shown in dashed lines), although both are integral with the arms 14a and 14b, including an inner portion 38 on the side of the latch-receiving pocket 34 toward the arms 14a, 14b and an outer portion 40 on the side toward the end 24 of the cable-holding portion 12. Outer portion 40 includes an integral nub 42 extending from the bottom surface 44 of the head extension 28. To snap the rod cable support 10 together, the end 24 of the cable-holding portion 12 is lifted and the nose portion 32 including the integral lip 36 are placed into the latch-receiving pocket 34. The latch-receiving pocket 34 is narrower at the bottom surface 44 of the head extension 28 than the top surface 46. As the nose portion 32 and integral lip 36 are pushed further into the latch-receiving pocket 34, they are forced closer to the inner portion 38 of the head extension 28 by the narrowing pocket 34. Eventually the bottom surface 44 of the head extension 28 with the extending nub 42 are forced between the lip 36 and the adjacent inner surface 48 of the cable-holding portion 12 and cause the nose portion 32 and lip 36 to be forced away from the adjacent inner surface 48. When the nose portion 32 and lip 36 clear the bottom surface 44 of the head extension 28, the nose portion 32 and integral lip 36 snap back into their unbiased shape as a result of the resilient polymeric material of construction. As a result, the cable-holding portion 12 is snap locked into the latch-receiving pocket 34 on the head extension 28 and resists removal without a conscious effort to do so. As shown in the normally open configuration of the rod cable support 10 depicted in FIG. 1, the integral brace 22 extends as far as the central axis 58 common to circular bores 18a and 18b.

Figure 2:
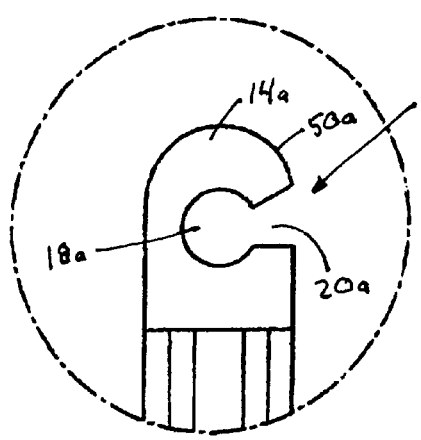
FIG. 2 is a detailed drawing of one of the arms of the rod cable support of FIG. 1 including the claw-shaped end.

Referring to FIG. 2, a detailed drawing of the top arm 14a of the rod cable support is shown. As previously mentioned, the top claw-shaped end 16a consists of the circular bore 18a and the slot 20a. The arms 14a, 14b may be sized to accommodate any of several existing rod diameters. For a ⅜" rod (not shown in FIG. 2), for example, the circular bore 1 8a is typically ⅜" diameter. As shown in FIG. 2, the slot 20a is wider on the outer periphery of the arm 50a than at the circular bore 18a. As the arm 14a is pressed against a rod (not shown in FIG. 2), the rod cable support, being constructed of resilient polymeric material, enables the claw-shaped end 16a to widen until the rod snaps into it. The arm then holds the rod securely. Although the reference numerals used in FIG. 2 refer to the top arm, the bottom arm exhibits the same arrangement.

Figure 3:
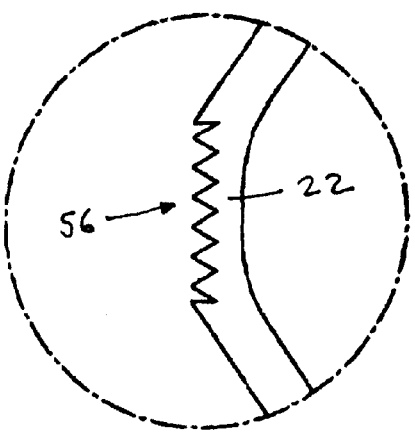
FIG. 3 is a detailed drawing of the brace portion of the rod cable support of FIG. 1.

A detailed drawing of the brace 22 is provided in FIG. 3. As shown in the figure, the brace 22 preferably includes serrations 56. If the rod cable support is attached to a threaded rod, the serrations provide a better grip that intermeshes with the threads on the rod (not shown in FIG. 3), thereby preventing the cable support from undesired sliding movements axially along the rod.

Figure 5:
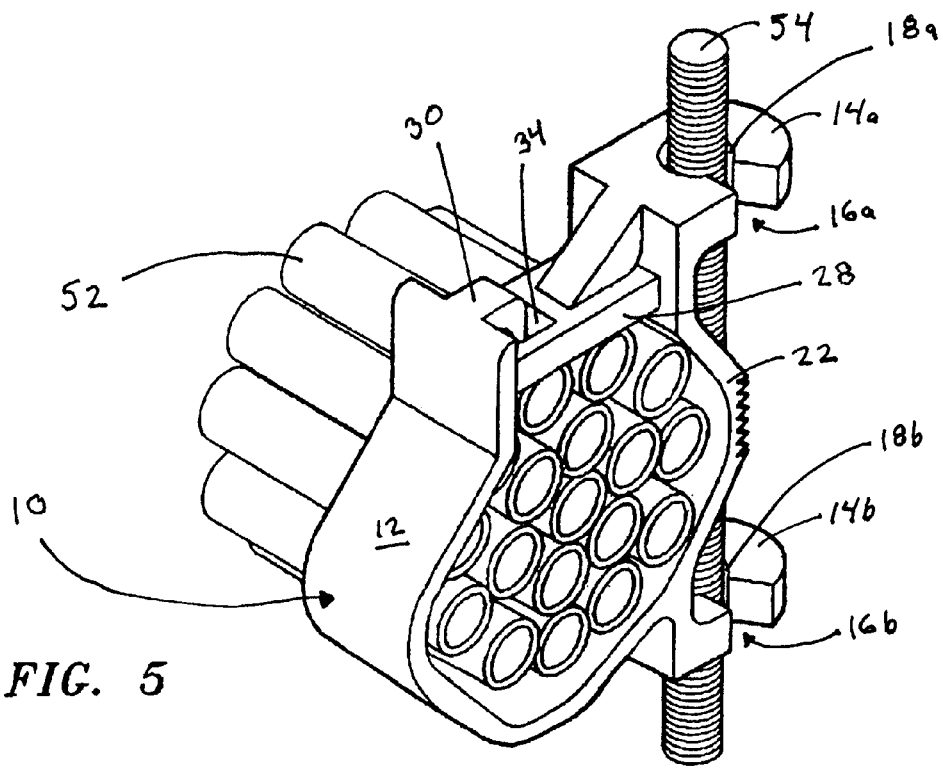
FIG. 5 is a perspective view of the rod cable support of FIG. 1 with cables installed in the cable-holding portion and the cable-holding portion closed.

Referring to FIG. 5, a perspective view is shown of the rod cable support 10 with a bundle of cables 52 installed in the cable-holding portion 12 and the snap-lock arrangement closed. The rod cable support 10 has been snapped onto a threaded rod 54 by the top 14a and bottom 14b arms. The threaded rod 54 is held in the circular bores 18a, 18b of the top 14a and bottom 14b arms. As previously mentioned, when the rod cable support 10 is in its open, unbiased configuration, the integral brace 22 on the outer edge of the cable-holding portion 12 extends typically to the axis between the two circular bores 18a, 18b. In the closed configuration of the rod cable support 10, as shown in FIG. 5, the brace 22 applies pressure to the rod 54, thereby resisting any efforts to slide the cable support 10 axially along the rod 54 or to twist it radially around the rod.

Accordingly, as described in the detailed description above, the rod cable support of the present invention has the advantage of being of one-piece construction, can be used with threaded or smooth rods, and provides for complete closure around cables without the use of cable ties. As a consequence of the positive locking action of the claw-shaped ends and brace upon an anchored rod and the snap-lock arrangement upon an inserted cable bundle, the rod cable support of the present invention can actually be used in conjunction with a rod anchored in any orientation, including horizontal. This is an advantage over existing rod cable supports with U-shaped hook members, as in an orientation other than vertical the cables tend to fall out of the U-shaped opening and must rapidly be secured with a cable tie to secure the cables.

Although the description above contains many specific descriptions and proposed sizes, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. A rod cable support comprising:

a one-piece body including a cable-holding portion and a snap-lock arrangement for opening and closing said cable-holding portion;

two arms extending from said cable-holding portion, said arms aligned in a plane perpendicular to said cable-holding portion, each of said arms including claw-shaped ends, said claw-shaped ends sized to accommodate a rod and snap-fittingly engage said rod; and a brace formed on the exterior of said cable-holding portion between said arms, said brace having an engaging surface adapted to apply pressure to said rod and thereby provide resistance to removal of said claw-shaped ends therefrom.

2. The rod cable support of claim 1 which is constructed of an elastic polymeric material.

3. The rod cable support of claim 1 wherein said claw-shaped ends include circular bores through said arms and slots leading into said circular bores from the periphery of said arms.

4. The rod cable support of claim 1 wherein said claw-shaped ends can accommodate and securely snap fit onto a smooth rod.

5. The rod cable support of claim 1 wherein said claw-shaped ends can accommodate and securely snap fit onto a threaded rod.

* * * * *